United States Patent [19]

Koshlyak et al.

[11] 4,341,724

[45] Jul. 27, 1982

[54] METHOD FOR THE MANUFACTURE OF CERAMIC PRODUCTS

[76] Inventors: Leonid L. Koshlyak, Zheleznodorozhny, ulitsa Svobody, 9a, kv. 134; Jury P. Kareev, Elektrougli, ulitsa Mayakovskogo, 22, kv. 62; Evgeny A. Romankov, Elektrougli, ulitsa Shkolnaya, 45, kv. 53; Sergei N. Zotov, Pavlovsky posad, Komsomolsky pereulok, 3, all of Moskovskaya oblast; Marx S. Belopolsky, ulitsa Oxkaya, 8, kv. 87; Villen V. Kalinovsky, Leningradskoe shosse, 92, kv. 54, both of Moscow, all of U.S.S.R.

[21] Appl. No.: 927,757

[22] Filed: Jul. 25, 1978

[30] Foreign Application Priority Data

Aug. 3, 1977 [SU] U.S.S.R. .................. 2513702

[51] Int. Cl.³ .............................................. C04B 33/30
[52] U.S. Cl. ........................................ 264/27; 264/66
[58] Field of Search ................. 264/64, 66, 26, 27, 264/56

[56] References Cited

U.S. PATENT DOCUMENTS

| | | | |
|---|---|---|---|
| 3,190,998 | 6/1965 | Dyke | 264/26 |
| 3,192,291 | 6/1965 | D'Onofrio | 264/26 |
| 3,270,102 | 8/1966 | Aiken | 264/27 |
| 3,976,728 | 8/1976 | Hawthorne | 264/26 |

*Primary Examiner*—John A. Parrish
*Attorney, Agent, or Firm*—Holman & Stern

[57] ABSTRACT

The method is characterized in that heat treatment of molded products at the stage of drying from the molding moisture content to an equilibrium moisture content is performed with internal and external heat application to the products with an intensity ensuring maximum moisture removal rate of not more than 0.5% per minute. The internal heat application is performed until maximum hygroscopic moisture content of products is achieved, and the external heat application is performed after the shrinkage of products is over.

2 Claims, No Drawings

METHOD FOR THE MANUFACTURE OF CERAMIC PRODUCTS

The present invention relates to the manufacture of building materials, and more particularly to a method for the manufacture of ceramic products.

The method of the present invention may be used for the manufacture of both flat and round ceramic products from a plastic body. The method may also be used for the manufacture of products from other materials which are heat treated at the drying and firing stages after the moulding.

Known in the prior art are methods for the manufacture of ceramic products, comprising moulding a product of a starting body and heat treatment of moulded products during their continuous movement.

The main disadvantages of such methods consist in inability to obtain products with dimensions in plan 30 and more times greater than the thickness as there is no allowance for special heat treatment conditions, and in a long time required for the heat treatment when products are made from plastic bodies.

Known in the prior art is also a method for the heat treatment of sheet products during drying with external and internal application of heat.

This method is deficient in that it is only suitable for flat products; the products cannot be moved during drying, and the drying is not uniform over the volume of the product with the difference in moisture content as high as 5–6%.

It is widely known to manufacture ceramic products by methods comprising moulding products of a starting body with subsequent heat treatment of the moulded products during their continuous movement. By these methods, drying from the moulding moisture content of 5–8% to the final moisture content of less than 0.5% is performed with an external heat application, and the products are fired in accordance with admissible heating and cooling rates, heating conditions during the dehydration period and duration of exposure at maximum temperature.

The main disadvantage of these methods consists in the inability to obtain products with dimensions in plan 30 and more times greater than the thickness as they involve no allowances for differences in moisture content of the products during drying and in temperature of the product during firing after the fusing is over. The resultant differences in moisture content and temperature cause disintegration of products.

Known in the prior art are methods for the manufacture of products from plastic bodies having a moulding moisture content greater than 18%. They also cannot permit products of large size to be obtained since heat treatment at the drying stage is performed with an external heat application. The external application of heat fails to ensure uniformity of drying, hence of shrinkage over the volume of the product and results in a deformation or disintegration of the product.

Known in the prior art is also a method for the heat treatment of products during drying with external and internal heat application. By this method a product is clamped between electrodes, and an electric current is caused to pass through the product with subsequent blowing of the product with a heat carrier.

This method has the following disadvantages: the product cannot be moved during drying; inadequate uniformity of drying over the volume of the product owing to overdrying at the points of contact with the electrodes; applicability of the method to flat products only.

It is the main object of the invention to provide a method for the manufacture of ceramic products having dimensions in plan 30 and more times greater than the thickness.

Another object of the invention is to reduce the time required for the heat treatment of products.

Further object of the invention is to reduce power consumption for the heat treatment.

These and other objects are accomplished by that in the manufacture of ceramic products involving moulding them of a plastic body with subsequent heat treatment during a continuous movement thereof, according to the invention, the heat treatment at the stage of drying from the moulding moisture content to an equilibrium moisture content is performed with internal and external application of heat to the products with an intensity ensuring maximum moisture removal rate of not greater than 0.5% per minute, the internal heat application being performed until maximum hygroscopic moisture content is achieved, and the external heat application being performed after the shrinkage of the product is over.

These objects are also accomplished by that according to the invention, the heat treatment at the firing stage, after the fusing of products is over, is performed within the temperature range from about 600° to about 400° C. with maximum temperature difference in one product of not more than 60° C. per one meter.

This method permits the internal stresses in the product to be substantially reduced, enables a lower heat consumption for drying, and the heat treatment time reduction.

The invention resides in the following. the internal application of heat to products provides heating of a product over the entire volume, the outer layers of the product having lower temperature than the inner ones owing to evaporation of moisture. It should be noted that temperature and moisture content gradients have one and the same direction thus accelerating the moisture transfer process.

As the product dries up to the moisture content corresponding to the end of shrinkage, the intensity of heating at the expense of internal heat application is reduced, and the external heat application beginning at that moment accelerates the process.

When maximum hygroscopic moisture content is achieved, the internal heat application becomes inefficient, and minimum power consumption can only be achieved with the external heat application. When the products acquire an equilibrium moisture content, any further drying is of no use.

An increase in the intensity of heat application to the product accelerates the drying, but after a maximum moisture removal rate for a given moisture content is achieved, the product may disintegrate owing to the build up of internal stresses. Moisture removal rate during drying may vary, but it shall not exceed 0.5% per minute to ensure the integrity of a product.

Heat treatment at the firing stage, after the fusing is over, in the temperature range of polymorphic transformations from about 600° C. to about 400° should be performed with maximum temperature difference in a product of 60° C. per one meter so as to ensure the integrity of product.

The invention will be better understood from the following specific embodiments thereof.

EXAMPLE 1

Slabs of a size 800×550×10 mm were moulded of a starting plastic body. The moulded products were dried during their continuous movement to maximum hygroscopic moisture content with an internal heat application by causing an electric current to flow through the slabs. After the products acquired the moisture content corresponding to the end of shrinkage, an external heat application was performed by blowing the products with hot air. After an equilibrium moisture content was achieved, the slabs were fed to a kiln for firing during their continuous movement.

Moulding, maximum hygroscopic and equilibrium moisture contents, moisture content corresponding to the end of shrinkage, temperature difference per one meter of the slab and temperature range during the period of cooling of the slabs are given in the table below.

EXAMPLE 2

Moulded slabs of a size 950×550×10 mm made of a plastic body were dried during a continuous movement to achieve maximum hygroscopic moisture content with an internal heat application by using high frequency current. After the moisture content corresponding to the end of shrinkage was obtained, an external heat application was performed using heated flue gases. The drying was completed at an equilibrium moisture content, and the products were then fired in a kiln during their continuous movement.

Moisture content and temperature ranges, rates of moisture removal and temperature differences per one meter of the product are given in the table below.

EXAMPLE 3

Moulded slabs of a size 1100×850×10 mm made of a plastic body were dried during continuous movement with an internal heat application by causing an electric current to flow through the product to obtain maximum hygroscopic moisture content. After the moisture content corresponding to the end of shrinkage was obtained, an external heat application was performed by irradiation. The slabs dried to an equilibrium moisture content were fired in a kiln during their movement.

Moisture content and temperature ranges, rates of moisture removal and temperature differences per one meter of the product are given in the table below.

|  | Mass 1 | Mass 2 | Mass 3 |
|---|---|---|---|
| Slab dimensions, mm | 800 × 550 × 10 | 950 × 550 × 10 | 1100 × 850 × 10 |
| Moulding moisture content, % | 27.1 | 24.0 | 27.3 |
| Moisture content for the end of shrinkage, % | 19.6 | 16.7 | 19.8 |
| Moisture removal rate, % per minute | 0.25 | 0.15 | 0.20 |
| Maximum hygroscopic moisture content, % | 14.2 | 12.7 | 15.3 |
| Moisture removal rate, % per minute | 0.36 | 0.25 | 0.30 |
| Equilibrium moisture content, % | 0.25 | 0.20 | 0.25 |
| Moisture removal rate, % per minute | 0.30 | 0.50 | 0.40 |
| Temperature range during the cooling of products, °C. | 650–400 | 600–400 | 600–350 |
| Temperature difference in the product, °C./m | 40 | 52 | 60 |

The above data show that the products were produced of different bodies. These masses had different moulding, maximum hygroscopic and equilibrium moisture contents, and different moisture contents corresponding to the end of shrinkage, as well as different "dangerous" temperature ranges after the fusing was over. Maximum moisture removal rate of not more than 0.5% per minute and temperature differences not exceeding 60° C. per one meter in each product enable the manufacture of ceramic products having the ratio of dimensions in plan to thickness which is substantially greater than 30.

Therefore, the method according to the invention makes it possible to manufacture large-size ceramic products of any plastic body.

Moreover, while the method has been developed for products having the dimensions in plan 30 and more times greater than the thickness, it is also applicable to products of smaller size. In such applications the heat treatment time and energy requirements for the manufacture of products are reduced.

What is claimed is:

1. A method for the manufacture of ceramic products comprising moulding products of a starting plastic body and subsequent heat treatment of the moulded products during their continuous movement; said heat treatment being performed at the stage of drying from the moulding moisture content to an equilibrium moisture content with external and internal heat application to the products with an intensity ensuring maximum moisture removal rate of not more than 0.5% per minute, the internal heat application being performed until maximum hygroscopic moisture content of products is achieved, and the external heat application being performed after the shrinkage of the products is over and thereafter firing the products.

2. A method according to claim 1, wherein the heat treatment at the firing stage, after the fusing of products is over, is performed at a temperature within the range from about 600° C. to about 400° C. with maximum temperature difference not exceeding 60° C. per one meter in one product.

* * * * *